April 14, 1925.                    T. A. LUSHER                    1,533,933
                                   GEAR WHEEL
                                Filed April 8, 1924
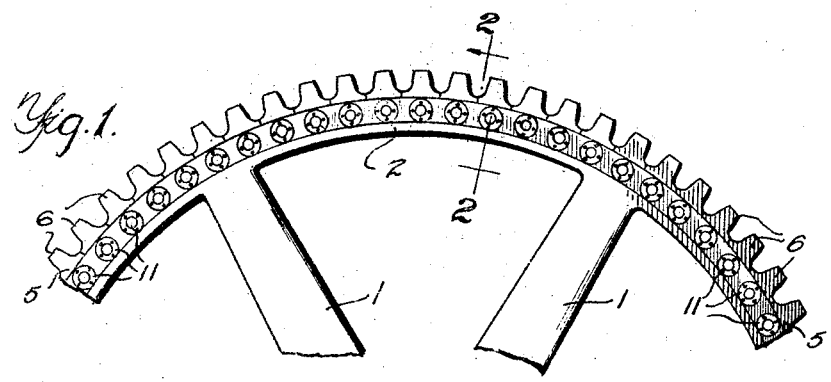
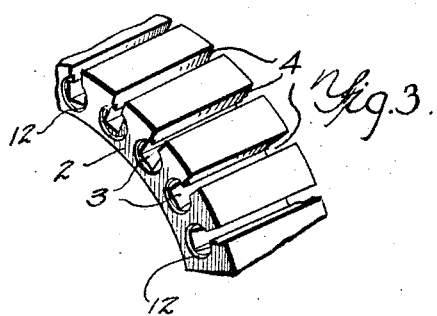
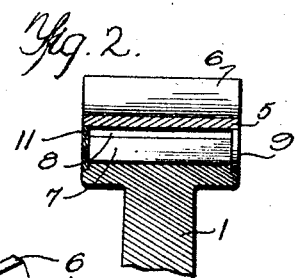
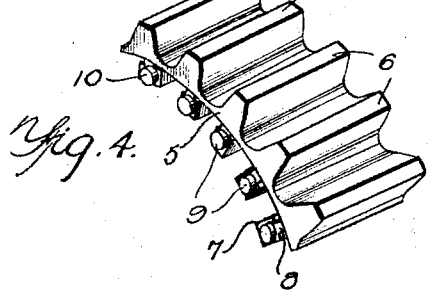
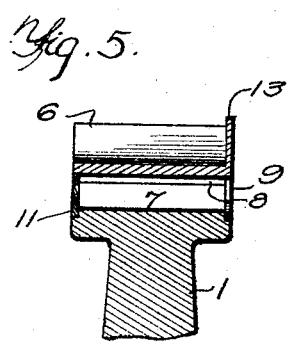
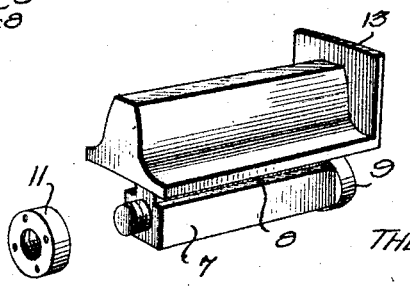
Inventor
THEODORE A. LUSHER
By
Attorney Patented Apr. 14, 1925.

1,533,933

UNITED STATES PATENT OFFICE.

THEODORE AUGUSTUS LUSHER, OF PITTSBURG, KANSAS.

GEAR WHEEL.

Application filed April 8, 1924. Serial No. 705,109.

*To all whom it may concern:*

Be it known that I, THEODORE AUGUSTUS LUSHER, a citizen of the United States, residing at Pittsburg, in the county of Crawford and State of Kansas, have invented certain new and useful Improvements in Gear Wheels, of which the following is a specification.

This invention relates to gear wheels:

An object of the invention is to provide a gear wheel having removable teeth and and improved means for retaining the teeth on the wheel.

A further object of the invention is the provision of a gear wheel in which the entire tooth section may be renewed at a fairly nominal cost.

A further object is the provision of a gear wheel in which one or more teeth that are sheared off or broken may be replaced without removing the gear from the shaft.

A further object is the provision of a tooth of this character which may be inserted in the wheel in such manner as to provide a joint that will not wear loose.

In the accompanying drawings, I have shown several embodiments of the invention. In this showing:

Figure 1 is a side elevation of a portion of a gear wheel showing a plurality of removable teeth formed on a single segment, Figure 2 is a detail sectional view on line 2—2 of Figure 1.

Figure 3 is a perspective view of a portion of the felly of the wheel with the teeth removed, Figure 4 is a perspective view of one segment removed from the wheel, Figure 5 is a view similar to Figure 2 showing a slightly modified form, and, Figure 6 is a detail perspective view of a tooth shown in Figure 5.

Referring to Figures 1 to 4 of the drawings, the reference numeral 1 designates the spokes of a wheel having a hub (not shown) and having a felly 2. The felly is provided with transverse grooves or cut out portions 3, substantially rectangular in vertical cross section and with reduced slots 4 communicating therewith, forming a mortise. In this form of the invention, I provide segments 5, adapted to be arranged on the felly of the wheel. These segments are provided with gear teeth 6. The inner faces of the segments are provided with ribs 7 which are reduced in cross section adjacent their inner ends, as at 8, to fit within the grooves 3 and slots 4. One end of each of the ribs 7 is provided with a collar 9 adapted to be received in a recess in the face of the gear and lie substantially flush with the side of the gear, as shown in Figure 2 of the drawings. The other end of the rib is reduced, and is circular in cross section, as indicated at 10. This end is threaded and is adapted to receive a threaded washer or nut 11. As shown, the nut is received in a circular recess 12 in the opposite face of the gear and lies substantially flush with the side.

In the form of the invention shown in Figures 5 and 6 of the drawings, the construction of the grooves, slots, and ribs is the same as heretofore described. Instead of forming a plurality of teeth on a single segment, I provide separate teeth, as shown. Each of the teeth may be provided with a flange 13 on one side.

The advantages of this construction will be obvious. Instead of forming the wheel of iron, it may be made of steel and, as stated, any one or more of the teeth may be removed and replaced without taking the wheel off the shaft or axle. The mortise and tenon connection between the teeth and the felly forms a tight joint that will not become loose due to wear.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

I claim:

1. In a gear wheel, a felly having a plurality of spaced, transverse grooves, a removable tooth adapted to be arranged on the felly of the wheel, said tooth being provided with a rib on the base thereof adapted to fit in one of said grooves, a collar formed on the end of said rib, the side of said gear wheel being provided with a recess adapted to receive said collar, and fastening means adapted to engage the opposite end of said rib.

2. In a gear wheel, a felly having a plurality of spaced grooves, said grooves being of greater width at the bottom than at the top, a removable tooth adapted to be arranged on the felly of the wheel, said tooth being provided with a rib on the base thereof shaped in cross section to fit one of said grooves, a collar formed on one end of said rib, the side of said gear wheel being provided with a recess adapted to receive said collar, and fastening means adapted to engage the opposite end of said rib.

3. In a gear wheel, a felly having a plurality of spaced grooves, said grooves being of greater width at the bottom than at the top, a removable tooth adapted to be arranged on the felly of the wheel, said tooth being provided with a rib on the base thereof shaped in cross section to fit one of said grooves, a collar formed on one end of said rib, the side of said gear wheel being provided with a recess adapted to receive said collar, the opposite end of said rib being reduced and being circular in cross section, said reduced end being threaded, and a nut arranged thereon.

4. In a gear wheel, a felly having a plurality of spaced, tapered, transverse grooves, said grooves being of reduced cross section adjacent the top, a removable tooth adapted to be arranged on the felly of the wheel, said tooth being provided with a tapered rib on the base thereof shaped in cross section to fit one of said grooves, a collar formed on one end of said rib, the side of said gear wheel being provided with a recess adapted to receive said collar, and securing means arranged on the opposite end of said rib.

In testimony whereof, I affix my signature in presence of two witnesses.

THEODORE AUGUSTUS LUSHER.

Witnesses:
H. J. VEATCH, M. D.,
BEN W. WEIR.